United States Patent [19]

Wells

[11] Patent Number: 5,120,332

[45] Date of Patent: Jun. 9, 1992

[54] GAS RESONANCE DEVICE

[75] Inventor: Alan Wells, Cambridgeshire, England

[73] Assignee: The Haser Company Limited, United Kingdom

[21] Appl. No.: 435,122

[22] Filed: Nov. 13, 1989

Related U.S. Application Data

[63] Continuation-in-part of Ser. No. 398,306, Aug. 22, 1989, Pat. No. 4,948,360, which is a continuation of Ser. No. 117,783, Nov. 6, 1987, abandoned.

[30] Foreign Application Priority Data

Nov. 6, 1986 [GB] United Kingdom ............... 8626562
Nov. 10, 1988 [GB] United Kingdom ............... 8826377

[51] Int. Cl.$^5$ ............................................. B01D 53/04
[52] U.S. Cl. ......................................... 55/208; 55/387; 55/389
[58] Field of Search ............... 55/25, 26, 33, 58, 62, 55/68, 74, 75, 161–163, 179, 387, 389, 208, 267, 269

[56] References Cited

U.S. PATENT DOCUMENTS

| | | | |
|---|---|---|---|
| 3,121,625 | 2/1964 | Broughton | 55/58 |
| 3,164,454 | 1/1965 | Wilson | 55/58 X |
| 3,236,028 | 2/1966 | Rutan | 55/33 |
| 4,144,037 | 3/1979 | Armond et al. | 55/58 |
| 4,194,891 | 3/1980 | Earls et al. | 55/58 X |
| 4,194,892 | 3/1980 | Jones et al. | 55/58 |
| 4,354,859 | 10/1982 | Keller, II et al. | 55/68 X |
| 4,406,675 | 9/1983 | Dangieri et al. | 55/26 |
| 4,702,903 | 10/1987 | Keefer | 55/28 X |
| 4,801,308 | 1/1989 | Keefer | 55/68 X |

Primary Examiner—Robert Spitzer
Attorney, Agent, or Firm—Sughrue, Mion, Zinn, Macpeak & Seas

[57] ABSTRACT

A gas resonance device (101) comprises a pulsed combustor (102) located in the middle of a substantially spherical resonance chamber (103). Such a thermally driven gas resonance device has the advantage that the wall friction losses are eliminated altogether. A thermally driven gas resonance device (1, 101) may be combined with a pressure swing gas separator (16, 108), the oscillating gas in the gas resonance device (1, 101) being used to provide the pressure changes required to drive the pressure swing gas separator. Alternatively a thermally driven gas resonance device (1, 101) is combined with a heat pump (19, 120) with the oscillating gas in the gas resonance device (1, 101) being used to provide the power to operate the heat pump. The thermally driven gas resonance device (1, 101) may also drive an electrical generator (121, 122) to provide a combined heat and power device.

16 Claims, 8 Drawing Sheets

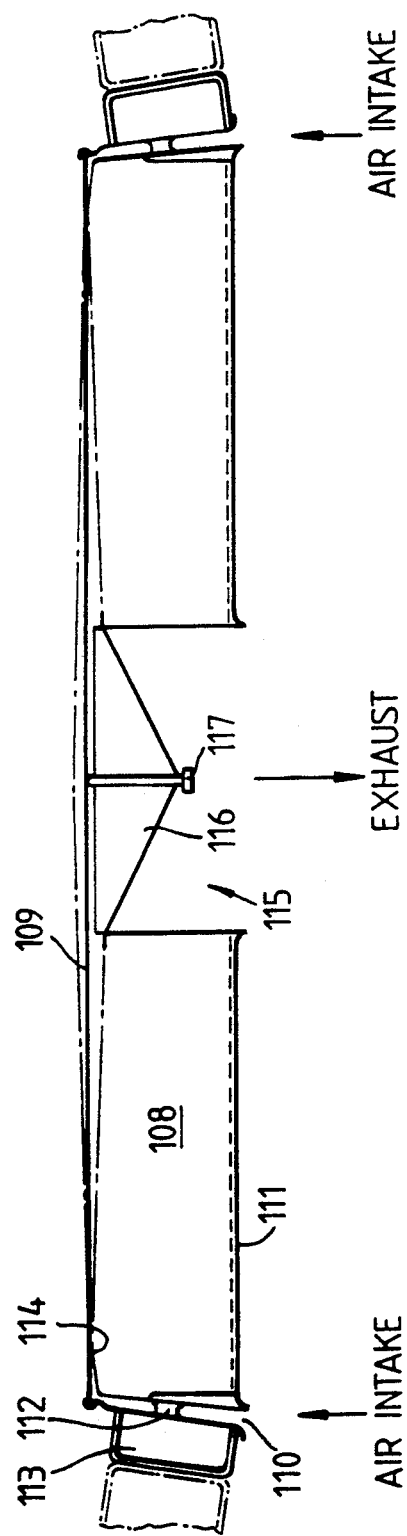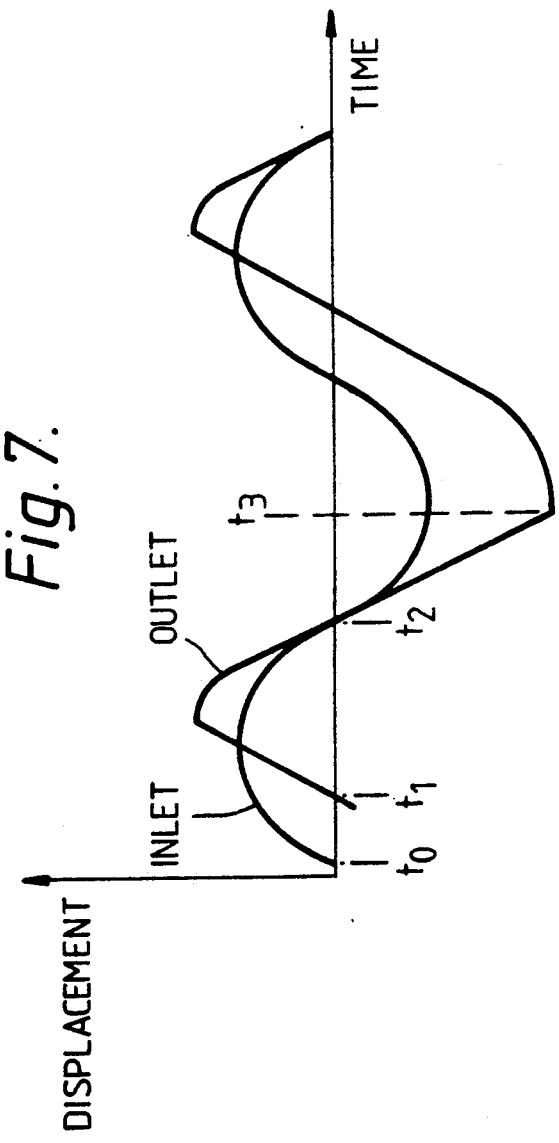

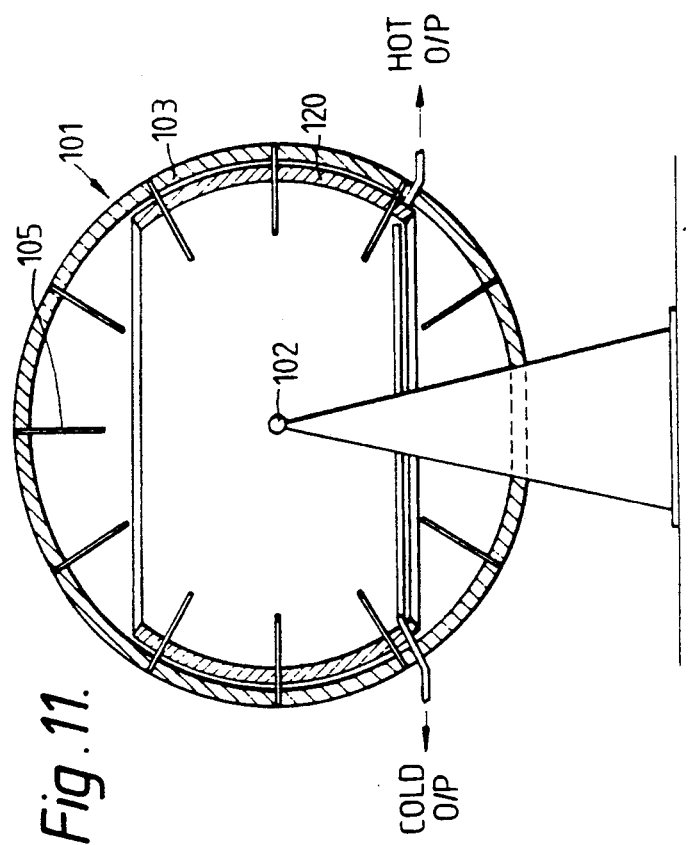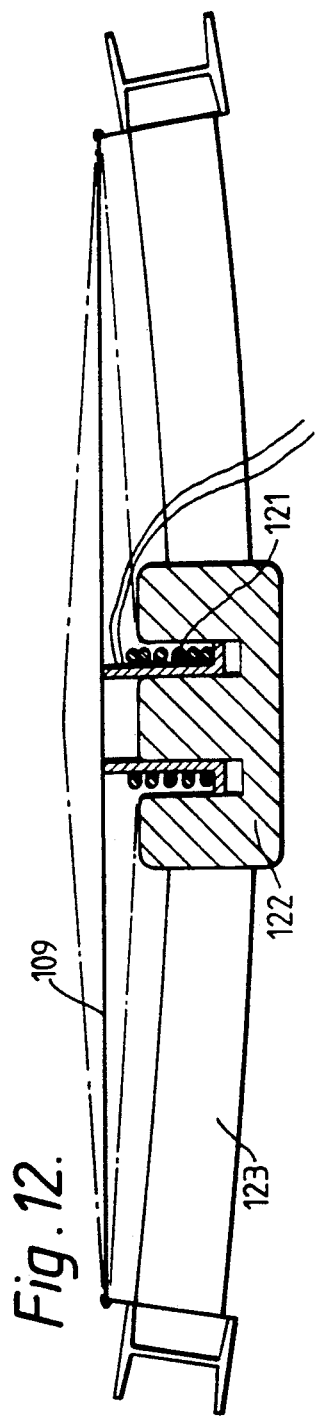

GAS RESONANCE DEVICE

This application is a continuation-in-part of Ser. No. 07/398,306, filed on Aug. 22, 1989, now U.S. Pat. No. 4,948,360, which is a continuation of Ser. No. 07/117,783, filed on Nov. 6, 1987, now abandoned.

BACKGROUND OF THE INVENTION

My earlier U.S. Pat. Nos. 4,948,360 and 5,006,060, the priority of which is claimed and the content of which is incorporated herein by reference describes and claims a gas resonance device comprising a resonance tube which expands in cross section along its length from one end to the other, a heat source located at the one end of the resonance tube, and means to trigger oscillations in a gas in the resonance tube. The resonance tube is preferably of ogival form and the heat source and means to trigger oscillations in a gas in the resonance tube are preferably formed by a pulsed combustor having a pulse repetition frequency corresponding to a resonant frequency of the gas resonance tube. The pressure waves generated by such a thermally driven gas resonance device are described as operating a pressure swing gas separator or a heat pump.

My earlier patents explain that one of the main limiting factors on the efficiency of this type of gas resonance device is the wall friction that occurs between the oscillating gas in the resonance tube and the side wall of the resonance tube. By making the side wall of the resonance tube of ogival form it is possible to reduce these wall friction losses and so improve the overall efficiency of the gas resonance device.

SUMMARY OF THE INVENTION

According to a first aspect of this invention a gas resonance device comprises a pulsed combustor located in the middle of a substantially spherical resonance chamber.

A thermally driven gas resonance device in accordance with this invention has the advantage that the wall friction losses discussed in my earlier specification are eliminated altogether. The pulsed combustor produces a substantially spherical expanding wave front which encounters no wall friction whatsoever as it moves from the middle of the resonance chamber to the outside of the resonance chamber. This completely avoids the wall friction losses discussed in detail in my earlier specification.

Preferably the gas resonance device includes means to provide an explosive gas mixture to the pulsed combustor. Preferably the pulsed combustor has a pulse repetition frequency corresponding to the resonance frequency of the substantially spherical resonance chamber which, largely, is dependent upon its radius. The means to supply the explosive mixture to the pulsed combustor may itself include a tuned valve or a resonance tube so that the pulsed combustor receives a pulsed supply of explosive mixture. In this case the explosive mixture is preferably supplied at the resonance frequency of the substantially spherical resonance chamber.

A second aspect of this invention comprises a thermally driven gas resonance device in combination with a pressure swing gas separator, the oscillating gas in the gas resonance device being used to provide the pressure changes required to drive the pressure swing gas separator.

According to a third aspect of this invention a thermally driven gas resonance device is combined with a heat pump with the oscillating gas in the thermally driven gas resonance device being used to provide the power to operate the heat pump.

In the case of the second and third aspects of this invention the thermally driven gas resonance device may be formed in accordance with the first aspect of this invention or may be formed by a resonance tube which expands in cross-section along its length from one end to the other as described in my earlier patents.

Preferably the pressure swing gas separator comprises a bed of adsorbent material located at the periphery of the substantially spherical resonance chamber or at the widest end of the conical resonance chamber. Typically the adsorbent material is an expanded zeolite but active carbon may also be used. Preferably the resonance chamber is formed as an icosahedron with triangular segments having rounded edges. In this case each bed of adsorbent material preferably has a generally circular configuration with the beds being located in the wall of the resonance chamber with three circular beds contained wholly within each substantially triangular segment of the icosahedron and one bed centred on each point of the icosahedron.

When the gas resonance device includes a heat pump preferably it includes a regenerator located adjacent, but spaced from, the periphery of the substantially spherical resonance chamber or the widest end of the conical resonance chamber. In the spherical resonance chamber preferably the regenerator is formed as an equatorial belt. The regenerator preferably includes a heat sink located on its side adjacent the outside and remote from the pulsed combustor. Preferably a source of low grade heat is introduced into the resonance chamber on the side of the regenerator towards the pulsed combustor. This source of low grade heat may be formed by a supply of air from the atmosphere but preferably it is formed by a number of water jets arranged to provide a water spray into the inside of the resonance chamber. The water jets may also be included in the pressure swing gas separator to assist in the removal of the heat that is not converted into mechanical energy in the resonance chamber. A small proportion of the water that is sprayed in is flash evaporated and this flash evaporation supplements the mechanical power generated in the resonance chamber. The droplets that are not flash evaporated cool the gas in the resonance chamber during the subsequent expansion cycle and the heated water aggregating from these water droplets is drained from the base of the substantially cylindrical chamber and may be used as a heat source, or merely cooled, and recirculated.

With this arrangement the effects discussed earlier are used to provide a heat engine driven heat pump. Thus the oscillations in the gas in the resonance tube are applied to the regenerator to produce a temperature differential across it with the gas downstream of the regenerator being heated and with the gas upstream from the regenerator being cooled. The heat exchange that takes place upstream of the regenerator provides the heat for the expansion of the gas upstream from the regenerator and provides the source of the heat which is pumped to provide part of the heat removed by the heat sink. In addition to this the heat sink also receives heat provided by the heat source. The applicant has coined the acronym HASER to describe this type of heat engine driven heat pump with the acronym standing for "Heat Amplification by Stimulated Emission of Radiation" by analogy with the acronyms laser and maser.

When the source of low grade heat is the atmosphere, it is preferred that a direct heat exchange takes place between the atmosphere and gas in a region upstream of the regenerator. To provide this gas exchange, ports are provided in the wall of the resonance chamber at the position of a pressure null point.

When the resonance chamber is of ogival form the heat sink may comprise a shallow pool of water and, in this case, it is preferred that fins of a good thermal conductor such as metal are in thermal contact with the pool of water and extend in the space between the pool of water and the downstream side of the regenerator. Such a heat sink has a good thermal contact with the hot gas downstream of the regenerator. The water in the pool is circulated around a system to carry the heat away from the other end of the resonance tube and this circulation system may include non-return valves on both sides of the pool so that the water is driven around the system by the pressure fluctuations inside the resonance tube acting on the surface of the water in the pool.

Such a device has particular application as a hot water generator for use in heating and cooling a residential building. The device is typically located in the roof space of a building and, in winter, the roof space is ventilated or air from outside ducted to it so that air provides the source of low grade heat. The heat sink at the other end of the resonance tube is used to heat water to a temperature of say 40° C. and this water is used for domestic hot water requirements and is circulated around a central heating system of the building. During summer the device is used to provide cooling for the building by closing the ventilation of the roof space and opening cooling vents in ceilings of the rooms below the roof space or ducting the air leaving the device to the rooms. Water from the heat sink is used for domestic hot water requirements and also is led away to a heat exchanger outside the building where it is cooled. The resulting cool air discharged from the resonance tube cools the roof space and, in turn, through the cooling vents in the ceilings, or via the ducting cools the building.

According to a fourth aspect of this invention a pressure swing gas separator comprises a thermally driven gas resonance device including a pulsed combustor and a resonance chamber, a diaphragm bounding part of the resonance chamber and a bed of adsorbent material adjacent the diaphragm and on the side of the diaphragm remote from the pulsed combustor.

The use of a diaphragm separating the inside of the resonance chamber from the bed of adsorbent material may be used with resonance chambers that are generally conical as described in my earlier specification or with resonance chambers that are substantially spherical. The mechanical oscillations of the gas cause corresponding oscillations of the diaphragm but the diaphragm provides a physical barrier which separates the bed of adsorbent material from the inside of the resonance chamber and so prevents combustion products from the pulsed combustor contaminating the bed of adsorbent material. Preferably the diameter, thickness and stiffness of the diaphragm are selected so that the diaphragm has a natural resonant frequency corresponding to that of the resonance chamber.

Preferably the bed of adsorbent material is housed within a closed chamber having a valve means to control the flow of mixed gas into and the exhaust of depleted gas from the side of the bed adjacent the diaphragm, and an outlet for the separated gas which passes through the bed of adsorbent material and emerges from it on the side of the bed remote from the diaphragm. Preferably the valve means includes an annular seat and the diaphragm forms its closure member. In this way, as the diaphragm moves towards and away from the bed of adsorbent material it opens and closes the valve means.

The valve means may include an exhaust valve located in the middle of the diaphragm so that the gas mixture moves radially inwards from the annular valve seat towards the middle of the diaphragm. In this case the exhaust valve is arranged to open after the inlet valve but closes at substantially the same time as the inlet valve. One way of achieving this is to have the exhaust valve closure member free to slide within limits on a spindle mounted on the diaphragm so that, in use, as the exhaust valve closure member moves with the diaphragm away from the adsorbent bed it is in a first position on the spindle but as it moves with the diaphragm towards the adsorbent bed it is in a second position on the spindle.

Alternatively the valve formed by the annular valve seat and the diaphragm acts as both an inlet and an exhaust valve. In this case it is preferred that a harmonic vibration is applied to the diaphragm so that, in addition to its fundamental oscillation towards and away from the adsorbent bed there is also a superimposed secondary vibration which appears as a wave moving from one side to the other of the diaphragm. In this way as the diaphragm is moving away from the bed, one side of the diaphragm lifts from its annular seat initially. A reduced pressure generated in the bed whilst the diaphragm is moving away from it draws gas mixture into the space between the diaphragm and the bed via the unseated diaphragm valve seat on the one side of the diaphragm. After a delay the other side of the diaphragm also unseats from the annular seat. The gas introduced into the one side of the diaphragm has a sideways momentum which is continued and encouraged by the flexing of the diaphragm and causes a gas flow from the one side to the other side of the diaphragm which causes the depleted gas from the space between the bed and the diaphragm to be exhausted from the other side of the diaphragm. As the diaphragm returns towards the adsorbent bed the one side of the diaphragm seats first against the annular valve seat followed by the other side. As the diaphragm continues to move towards the adsorbent bed it pressurises the bed and then moves away from the bed to depressurise it whereupon the one side of the diaphragm again lifts from its valve seat first and the cycle is repeated. In this way not only is a pressurising and depressurising operation carried out on the adsorbent bed by the fundamental oscillation of the diaphragm but also, as a result of the harmonic oscillation imposed upon the diaphragm a transverse wave motion on the diaphragm is created which drives the gas transversely across the top of the adsorbent bed. This provides a particularly effective scavenge operation which scavenges the depleted gas mixture from the top of the bed on each oscillation of the diaphragm.

This additional harmonic motion can be applied to the diaphragm by, for example, applying an eccentric mass to one side of the diaphragm, preferably matched by a corresponding lightening of the diaphragm on the other side. This is particularly useful when the diaphragm is driven by a thermally driven gas resonance device.

According to a fifth aspect of this invention a thermally driven gas resonance device comprises a resonance chamber containing a pulsed combustor, a flexible diaphragm bounding part of the resonance chamber and an electrical transducer which is coupled to the diaphragm and which generates electrical power upon the diaphragm oscillating as a result of the gas resonance inside the resonance chamber.

Such a gas resonance device is particularly useful as the power source in a combined heat and power installation. In such an arrangement the waste heat from the thermally driven gas resonance device provides a source of heat whilst the output from the electrical transducer provides electrical power. A small scale version of this aspect of the present invention may typically have the form of a conical resonance chamber similar to the haser device described earlier but including a flexible diaphragm at its largest end. Such an arrangement can provide both heat and power for a relatively small unit such as a remote and isolated dwelling. Preferably however the resonance chamber is substantially spherical or icosahedral as described above and in this case some of the elements of the icosahedron have electrical transducers attached to them whilst others are substantially rigid and include a regenerator adjacent but spaced from the periphery of the resonance chamber forming part of a heat pump to enhance the heat generation. Naturally the proportion of the elements of the icosahedron which are devoted to each application varies in relation to the required outputs. Preferably a heat sink is provided at the face of the regenerator nearer the pulsed combustor. This region is cooler than the region at the side of the regenerator remote from the pulsed heat source and thus this heat sink provides a cooling source. Thus a combined heat and power system can also be used to provide electricity and, for example, cooling for an air conditioning system during summer months.

According to a sixth aspect of this invention a thermally driven gas resonance device comprises a resonance chamber including a pulsed combustor and a bed of adsorbent material which preferentially adsorbs oxygen or nitrogen bounding at least part of the resonance chamber so that mechanical oscillations resulting from gas resonance within the chamber provides power for the pressure swing gas separator, the pressure swing gas separator performing a pressure swing gas separation on air to produce a gas phase which is rich in oxygen, a portion of the gas phase rich in oxygen being mixed with an inflammable gas or vapour and being fed to the pulsed combustor, the oxygen enrichment accelerating the combustion and so sharpening the intensity of the combustion pulses and, thereby, enhancing the mechanical resonances induced within the chamber.

When the resonance chamber is substantially spherical and formed as an icosahedron it is preferred that one of the elements on its outer surface is formed as a pressure swing gas separator module which is used to provide the oxygen enriched gas for combustion in the pulsed combustor. This is true whether the gas resonance device is otherwise used as, for example, a combined heat and power device or whether it is used essentially to drive a pressure swing gas separator or to drive a heat pump.

When the resonance chamber is substantially spherical or is formed as an icosahedron having its outer surface formed by a number of diaphragms at least one of these may be used as the diaphragm of a diaphragm pump. The diaphragm pump may be used to pump the combustion mixture to the pulsed combustor, to pump the gas mixture into the pressure swing gas separator, pump the separated gas product away from the pressure swing gas separator, pump heated or cooled water to or from the heat pump or for pumping any other fluid. In this case the diaphragm bounds part of a closed chamber having an inlet and an outlet valve. Again it is preferred that the diaphragm is tuned so that its natural resonant frequency corresponds to that of the resonance chamber.

BRIEF DESCRIPTION OF THE DRAWINGS

A device in accordance with the present invention is now described in detail with reference to the accompanying drawings, in which:

FIG. 6 is a section through a first example of gas-separator module;

FIG. 7 is a graph showing the displacement with respect to time of the valves of the first example of gas-separator module;

FIG. 11 is a sectional view of a fourth example of a gas resonance device; and,

FIG. 12 is a sectional view of a diaphragm and generator suitable for use in the fourth example.

DESCRIPTION OF PREFERRED EXAMPLES

Figure 1:
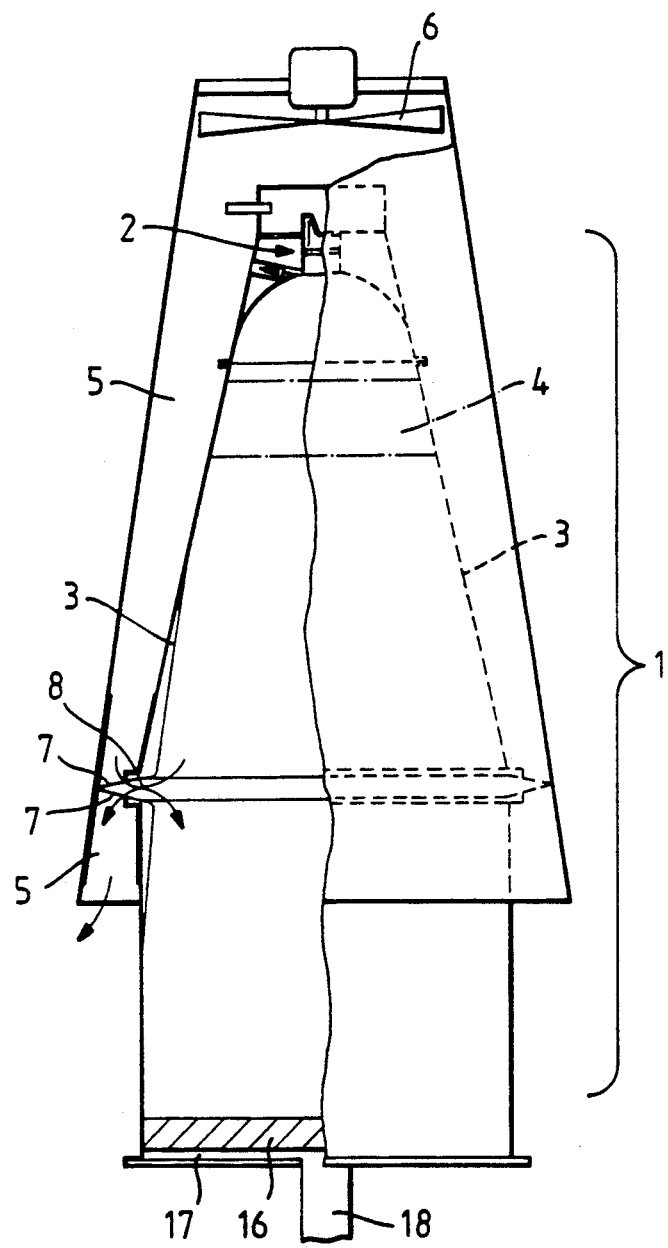
FIG. 1 is a partly sectioned side elevation of a first example.

In the first example a thermally driven gas resonance device 1 is formed by a pulsed heat source 2 mounted at one end of a resonance tube 3 which is ogival with its side walls curved in longitudinal section. The overall dimensions of the resonance tube 3 are such that its height is about three times its base diameter. A regenerator 4 may be included towards the top of the resonance tube and this is made from a thin walled metallic honeycomb or a non-metallic honeycomb which is typically made from glass or a glass-like material. An outer concentric annular chamber 5 surrounds the resonance tube 3 and an electrically driven fan 6 is mounted at the top to blow air downwards through the chamber 5. A corrugated annular baffle 7 directs the flow of air through alternate open ports 8 provided in the side wall of the resonance tube 3 at a pressure null point. Air is discharged through the other open ports 8 and a lower portion of the outer chamber 5. The open ports 8 produce orifice flow and therefore the inwards air flow through alternate ports 8 is strongly converging which ensures that charge and discharge through the open ports 8 is not unduly mixed.

Figure 3:
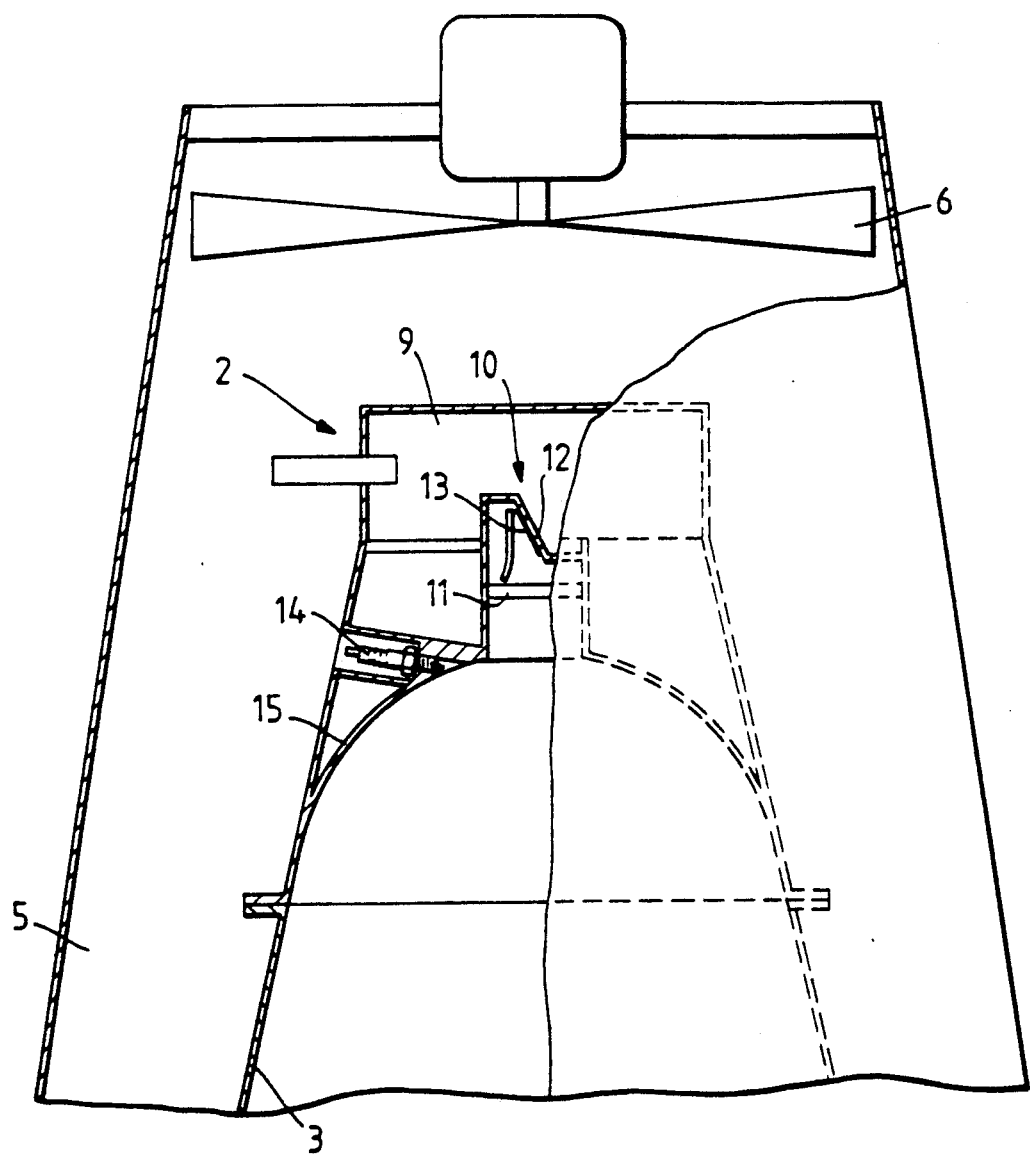
FIG. 3 is a cross-section through a heat source of the first and second example.

The pulsed heat source 2 is shown in more detail in FIG. 3 and comprises a gas mixing space 9 to which gas and air are supplied and in which they are mixed, a resonant non-return valve 10 of similar resonant frequency to that of the resonance tube 3, and a flame trap 11. The resonant non-return valve 10 may be similar to those fitted to two-stroke engines and comprise an open port 12 covered by a springy plate 13 which is fixed along one edge to the port 12. In response to the instantaneous pressure in the resonance tube 3 being greater than that in the gas mixing space 9 the valve is held closed with the springy plate 13 forming a seal against the edges of the port 12, and in response to an instantaneous reduction in pressure in the resonance tube 3 with respect to that in the gas mixing space 9, the springy plate 13 bends to allow the gas and air mixture to pass through the port 12 and into the resonance tube 3.

In a preferred configuration which leads to gas mixture delivery more closely in phase with the resonance chamber compression pulse, and thus to a concomitant improvement in pulsed combustion, the resonant non-return valve 10 consists of a metal disc of relatively large diameter, placed co-axially with the combustion chamber, clamped at its edge to a slightly concave bedplate in which the flame trap is centrally located. Gas mixture is introduced at low pressure to an internal annulus close to the clamped edge, and is thereby fed radially inwards in pulses towards the flame trap. The disc is of such thickness that its natural frequency of axial oscillation is lower than that of the resonance cavity so that the combined effect of the gas damping and the cavity pressure pulses is to produce substantially antiphase oscillations of the disc at the resonant frequency of the cavity. These oscillations introduce gas mixture through the flame trap to the combustion chamber at the time of pressure rise instead of the time of maximum suction, and the former diminishes the extent of premature combustion, which is inefficient with regard to heat engine operation.

The pulsed heat source 2 also includes a sparking plug 14 and the top of the resonance tube 3 is formed as a parabolic reflector 15 which spreads the effect of the pulsed heat source substantially uniformly over the end of the resonance tube 3.

The heat engine or gas resonance device 1 drives a gas oscillation down the resonance tube 3 and the vertically oscillating mass of gas functions as a piston producing pressure and adiabatic temperature fluctuations at top and bottom of the tube 3. The oscillations are triggered by the sparking plug 14 initially igniting the gas and air mixture introduced into the top of the resonance tube 3 and then, as the gas in the tube 3 begins to resonate and the valve 10 introduces successive bursts of mixture these are ignited by the fading flame from the previous ignition. This produces a pulsed combustion which, in a device having a resonance tube of length about 1 m, has a repetition frequency of around 200 Hz. The regenerator 4 increases the efficiency of the gas resonance device 1 by increasing the mean temperature of the top end of the resonance tube 3 and increasing the amplitude of the oscillations produced.

The gas resonance device 1 just described may be used to provide the mechanical energy input for a pressure swing gas separator and, in this case, as shown in FIG. 1 a shallow bed 16 of a zeolite which preferentially adsorbs nitrogen is placed towards the lower end of the resonance tube 3 and the base of the resonance tube is closed by a plate 17 including a gas outlet 18.

During resonant oscillation in the resonance tube 3 as the air moves forwards into the zeolite bed 16 nitrogen is preferentially adsorbed by the zeolite. As the air moves backwards a reduced pressure is created and the gases adsorbed onto the surface of the zeolite are desorbed so that air rich in nitrogen is desorbed. As a result of the finite displacements of gas that occur during oscillation the average pressure inside the resonance tube 3 is greater than atmospheric so that a flow of gas passes through the zeolite bed 16 resulting in a flow of gas out of the outlet 18 which is rich in oxygen whilst the flow of gas out of the ports 8 and through the lower part of the chamber 5 is rich in nitrogen.

Figure 8:
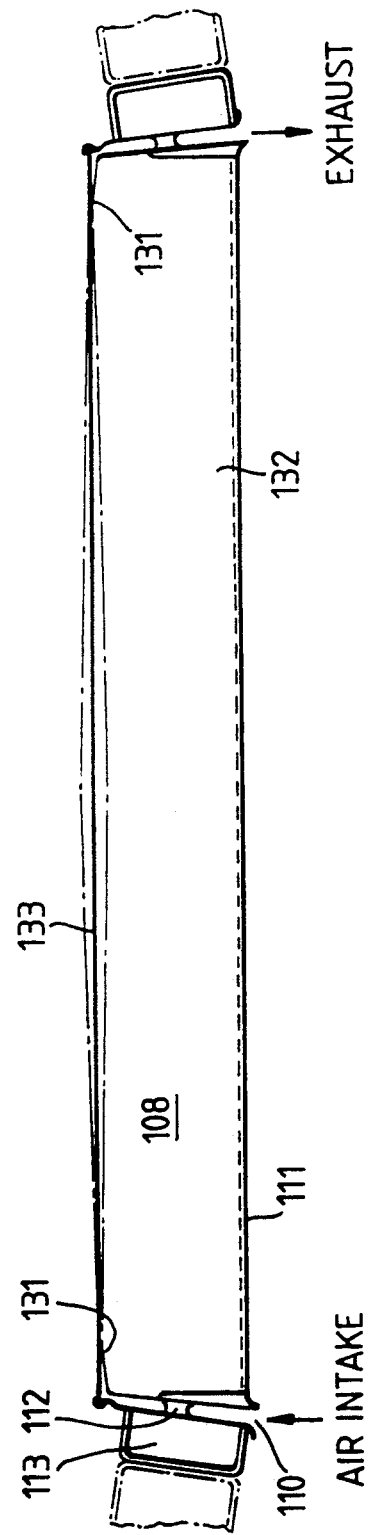
FIG. 8 is a section through a second example of gas-separator module.
Figure 9:
FIG. 9 is a cross-section to an enlarged scale through the diaphragm.

Preferably the zeolite bed 16 is formed as subsequently described with reference to FIGS. 6 or 8 and preferably the wide end of the resonance tube 1 includes a diaphragm as illustrated in FIG. 9.

The heat engine 1 may alternatively be used to provide the mechanical energy to drive a heat pump 19. A heat engine driven heat pump has an overall coefficient of performance (COP) where $$COP = \frac{\text{low grade heat out}}{\text{high grade heat in}}$$

in excess of unity, provided that the adiabatic temperature ratio of the latter significantly exceeds that of the former. The heat output may also be directly supplemented by heat rejected from the heat engine or gas resonance device 1. The heat pump part 19 of the apparatus comprises a regenerator 20 which is made from a thin walled metallic honeycomb or a non-metallic honeycomb which is typically made of glass or glass-like material, and a heat sink 21. The heat sink 21 is formed by a shallow pool of water 22 in the large diameter end of the resonance tube 3 and metallic fins 23 in thermal contact with the shallow pool of water 22 extend into the resonance tube 3 towards the regenerator 20. Air, which in this case provides the low grade source of heat enters and leaves through the ports 8 and heat is extracted from this air by the heat pump 19 and transferred to the water 22 in the heat sink 21.

Thus, in operation, gas oscillations are induced by the heat engine or gas resonance device 1 inside the resonance tube 3. These oscillations provide the driving power for the heat pump 19 including the regenerator 20. As the gas oscillates around the regenerator 20 the space beneath the regenerator 20 is heated and the space above the regenerator 20 cooled. Air flow through the ports 8 mixes with the gas in the resonance tube 3 and gives heat to the gas in the resonance tube 3 above the regenerator 20. The heat sink 21 removes the build up of heat beneath the regenerator 20.

Typically the level of the shallow pool 22 of circulating water in the heat-sink 21 is controlled by a float valve (not shown). A water inlet and outlet for the pool 22 includes non-return valves (not shown) and the gas oscillations set up in the resonance tube 3 act on the surface of the water in the pool 22 and cause circulation of the water through the inlet and outlet non-return valves. Typically the water outlet temperature is about 40° C. and this can be used as a source of domestic hot water or a source of hot water for driving a central heating system. Typically a heat engine driven heat pump or haser as shown in this example is mounted in the roof space of a house which is ventilated in the winter to allow air from the atmosphere to provide the source of low grade heat entering and leaving the ports 8. If desired to cool the building during the summer months, ventilators for the roof space would be closed and ceiling louvres opened to allow the cold air generated by the haser to gravitate into the house. In this case the hot water discharged from the heat sink 21 is, after the needs for domestic hot water have been supplied, passed to an atmospheric heat exchanger out of doors to dissipate the heat generated in the haser before being recirculated. The target value of the COP for such a haser would be 2 in the heating mode.

The details of the gas resonance dynamics, the desirability of the ogival shape of the resonance chamber, a discussion on the wall friction losses, and a discussion on the characteristics of the regenerator 20 are discussed in detail in my co-pending U.S. Pat. Nos. 4,948,360 and 5,006,060.

Figure 4:
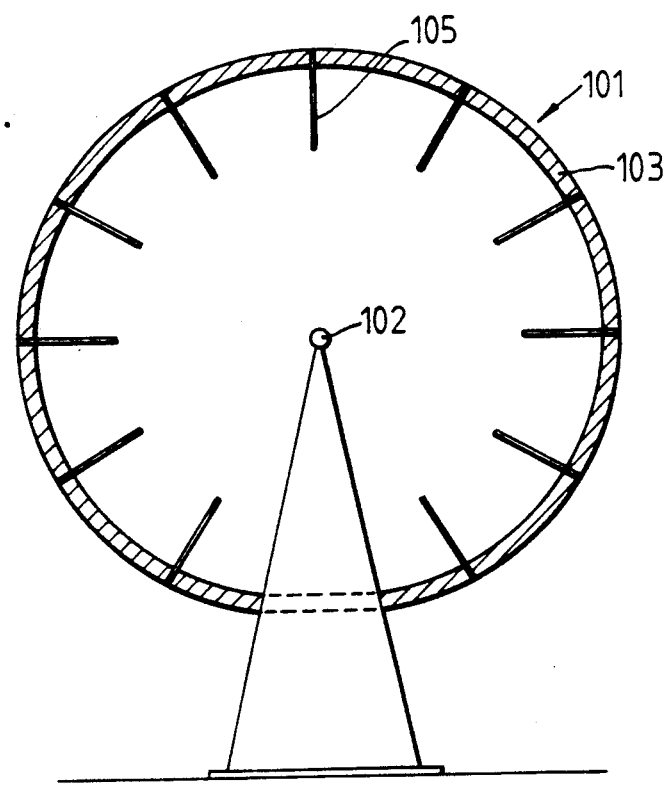
FIG. 4 is a cross-section through a third example.
Figure 5:
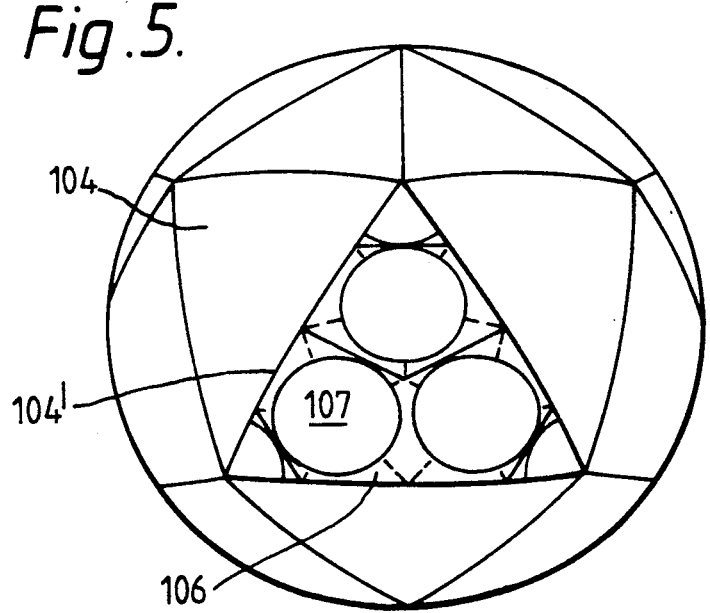
FIG. 5 is a partially cut-away plan of the third example.

A third example of thermally driven gas resonance device is shown in FIGS. 4 and 5 and comprises a generally spherical chamber 101 and a pulsed combustor 102 positioned centrally within the chamber. The combustor 102 includes a tuned non-return valve 10 such as that described in the first and second examples. A combustion mixture of air and an appropriate fuel gas is admitted to the chamber 101 via the tuned non-return valve 10. The combustion mixture is periodically ignited at a frequency matched to the resonant frequency of the spherical chamber 101. A sparking plug is provided in the combustor to cause the initial ignition but subsequently the pulsed combustion is self-sustaining.

As an alternative to the use of a tuned non-return valve 10 in the combustor 102 the combustion mixture may be supplied to the chamber 101 via a resonant gas-supply tube which extends into the chamber 101 and is tuned to supply the combustion mixture in pulses at the required pulse repetition frequency.

The operation of the combustor in the manner described above provides a pulsed heat source at the centre of the chamber 101 which produces a substantially spherical expanding wave front. Since the frequency of the combustor is matched to the resonant frequency of the chamber 101 the combustor drives resonant modes of the chamber, maximising the efficiency with which the heat energy of combustion is converted into the mechanical energy associated with the pressure swings in the gas within the chamber 101. In this example this mechanical energy is used to drive a gas separator used for oxygen enrichment.

In the third example of the present invention shown in FIGS. 4 and 5 the generally spherical chamber 101 is defined by a hollow icosohedral shell 103 formed of generally triangular elements 104 having curved sides. Open-ended exhaust tubes 105 extend into the chamber 101 from the outer surface of the shell 103. The radially innermost ends of the tubes 105 lie at points spaced from the centre of the spherical chamber 101 by about three-quarters of the sphere radius. There is a pressure null point in the resonant mode of the chamber at this radius. Combustion products can therefore be vented from the chamber 101 at these points with minimum power loss and external noise. If it is required to take the exhaust further away from the chamber 101 then the tubes 105 may project beyond the surface of the shell 103.

Pipes connected to an external water supply (not shown) are positioned concentrically within the exhaust tubes 105. These pipes provide inwardly directed water sprays. A small proportion of the water is converted to steam by the heat source during thermal pulses and so supplements the production of mechanical power. The remaining mist of water droplets cools the gases in the chamber 101 during the subsequent expansion cycle, prior to recompression, so removing excess heat energy and further increasing the efficiency of the device. Heated water aggregated from water droplets collecting on the internal spherical surface of the chamber 101 is drained away at the base and may be cooled and recirculated.

The modules in the chamber 101 are formed as gas-separator modules such as that shown with its outer surface cut-away in the element 104' of FIG. 5. Each gas-separator module comprises a number of circular elements 107. Each element 107 is shown in more detail in FIGS. 6 and 8 and comprises a dished zeolite bed 108 and a diaphragm 109 covering the bed 108 on its inwardly facing surface. Each element 107 is 0.8 metres in diameter and up to 72 such elements may be provided around the inner surface of a chamber 101 of 2 metres radius. In use, the pressure-swings at the periphery of the chamber 101 drive the diaphragm 109 back and forth in the radial direction, that is the direction transverse to the surface of the bed 108. Air is drawn in through an annular inlet 110 surrounding the periphery of the bed 108 and driven through the bed 108 in the manner described in further detail below. Oxygen-enriched gas leaving the bed 108 at its lower surface is collected under a skirt 111 and transferred via ducts 112 to the tubular framework 113 of the icosahedral shell 103. The tubular framework 113 is connected in common to all the gas separator modules 106 and provides a path from the modules 106 to an outlet (not shown) from which the oxygen-enriched gas is piped away.

As well as serving to isolate the zeolite bed 108 from the combustion gases within the chamber 101 the diaphragm 109 also serves to provide a valving arrangement which ensures that air is admitted and depleted air exhausted at appropriate points in the oscillatory cycle. The diaphragm 109 is dimensioned to have the same resonant frequency as the chamber 101. In the present example the diaphragm 109 is formed of steel with a diameter of 0.8 metres and a thickness of 6 mm. The diaphragm 109 is suspended at its edge outside the bed 108 so that in its equilibrium position it clears the periphery of the bed 108 but touches a valve seat 114 formed some 10 cm in from the outer edge of the bed 108. The part of the bed 108 extending radially outwards from this valve seat 114 is sealed so as to be impervious to air. The region of contact between the diaphragm 109 and the bed 108 serves to provide a valve which controls the intake of air from the port 110 to the main part of the bed 108. In the centre of the bed 108 there is a cylindrical exhaust outlet 115 which, when the diaphragm is in its equilibrium position, is sealed by a conical valve member 116. The valve member 116 rides on a spindle 117 fixed to the centre of the diaphragm 109.

The operational cycle of the pressure-swing gas separator is now described with reference to FIG. 7 which shows the displacement of the inlet valve and the outlet valve with respect to time. At time $t_0$ the diaphragm 109 is in its equilibrium position. Subsequently as the pressure of the gas in the chamber 101 immediately adjacent the diaphragm 109 drops, the diaphragm 109 is drawn back in the radially inwards direction away from the bed 108. The diaphragm 109 immediately clears the seat 114 thereby opening the valve inlet. However the exhaust valve remains closed since there is free movement between the spindle 117 and the valve member 116 so that although the spindle 117 is drawn up the valve member 116 remains seated. As a result during the period $t_0$ to $t_1$ a partial vacuum is created under the diaphragm 109 which draws in and accelerates air from the inlet 110 over the seat 114. At time $t_1$ as the diaphragm 109 moves further upwards the end of the spindle 117 engages the valve member 115, unseating it and so opening the exhaust valve. The air drawn under the diaphragm 109 from the inlet 110 is therefore drawn across the bed 108 and its momentum encourages it to continue to move radially in to the centre of the bed 108. As it does so it scavenges the depleted air initially present between the bed 108 and the diaphragm 109 and drives it out through the exhaust outlet 115.

Having reached its point of maximum displacement the diaphragm 109 then moves downwards towards the bed 108 again. At time $t_2$ the diaphragm 109 again reaches its equilibrium position and closes the inlet and exhaust valves. It should be noted that although there is a delay between the opening of the inlet and exhaust valve resulting from the play on the spindle 117, when the valves close at time $t_2$ they do so simultaneously. During the subsequent phase of the cycle the pressure under the diaphragm 109 increases driving the fresh air drawn through the annular inlet 110 into the zeolite bed 108. As the air moves forwards through the bed 108 the zeolite acts as a molecular sieve, preferentially adsorbing the nitrogen from the air so that the gas passing out through the bottom of the bed 108 is oxygen enriched/-nitrogen depleted. Then from time $t_3$ which is the point of maximum displacement in the opposite direction, towards the bed 108, the diaphragm 109 moves back towards its equilibrium position reducing the pressure above the bed 108. Under this reduced pressure nitrogen is desorbed from the bed 108 and drawn back towards the surface. As the diaphragm 109 reaches its equilibrium point the cycle is repeated with the next intake of air driving the oxygen depleted, nitrogen-rich gas from the surface of the bed 108 to the exhaust outlet 115. The cycle accelerates the gas throughout its passage across the face of the bed so that when it reaches the outlet 115 its momentum carries it away from the chamber 101 as a puff of gas which does not mix with the intake to the bed. During successive cycles the oxygen is driven down through the bed to its outer surface where it is conducted away in the manner already described.

Figure 10:
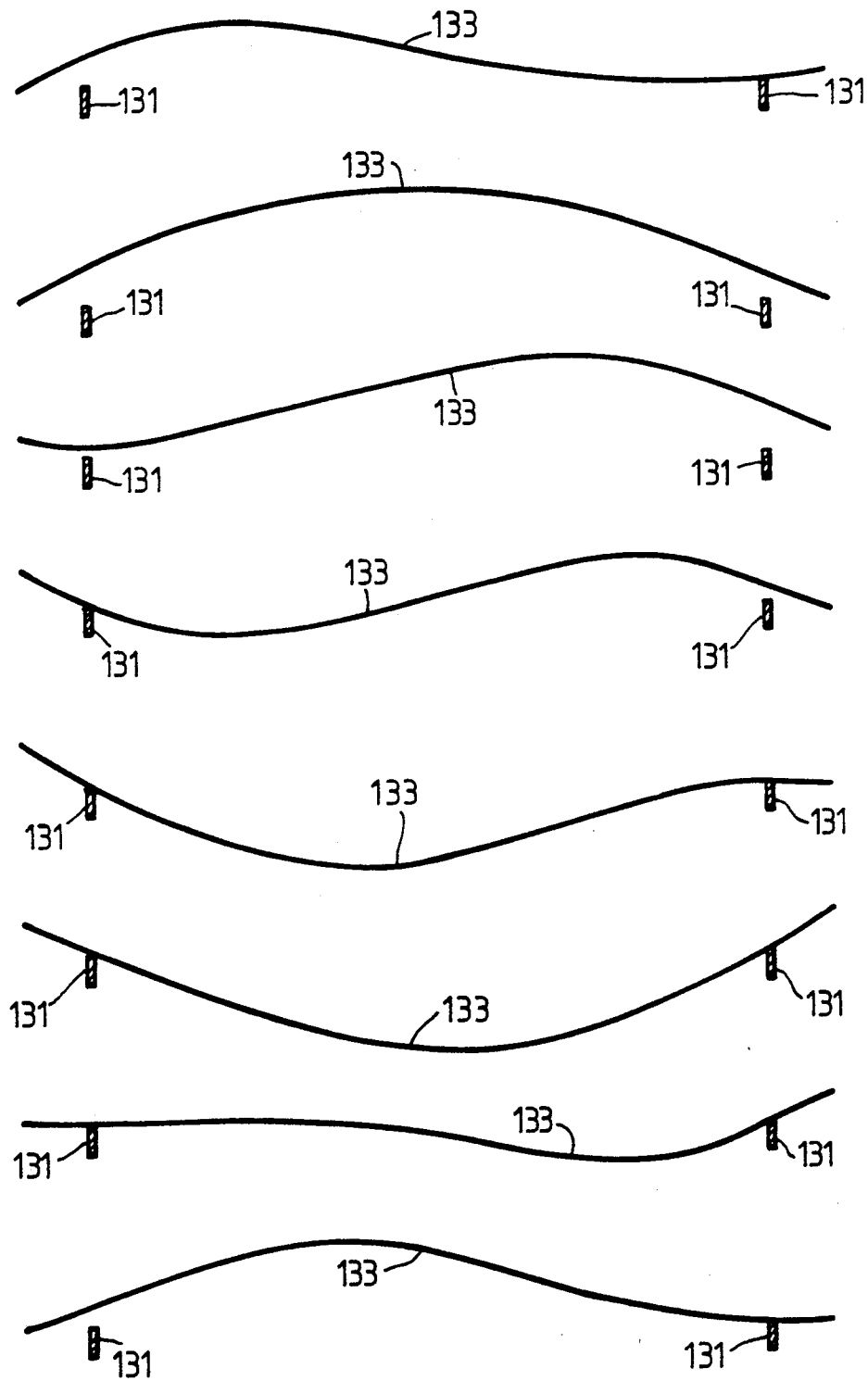
FIG. 10 is a series of cross-sections through the diaphragm of the second example of gas-separator module showing how it flexes.

A modification of the gas separator module is shown in FIGS. 8, 9 and 10. In this example an annular valve seat 131 surrounds a dished bed of adsorbent material 132. A thick tuned diaphragm 133 resonates at the resonance frequency of the substantially spherical chamber 101 or ogival resonance chamber 1 (not shown in FIG. 6). The bed 132 and annular valve seat 131 are generally similar to the bed 108 and seat 114. The diaphragm 133 is unbalanced and includes an added mass 134 on one side and a cut-away portion 135, shown in FIG. 9, on its other side. This assymetry in the diaphragm 133 leads to a harmonic oscillation being generated in the diaphragm 133 as it is oscillated backwards and forwards in the radial direction at the fundamental frequency by the wavefronts propagating in the chamber 1 or 101. This harmonic oscillation has the form of a transverse wave moving from left to right as shown in FIG. 10.

FIG. 10 illustrates this effect diagrammatically. In FIG. 10 the diaphragm 133 is represented by a line with the amplitude of the transverse oscillation greatly exaggerated to illustrate how, as the diaphragm 133 is moving away from the bed 132, first the left hand side, as shown in FIGS. 8, 9 and 10 lifts away from the annular seat 131 so allowing fresh air to be drawn in to the gap formed between the diaphragm 133 and the valve seat 131 at the left hand side of the gas separator module. Further movement of the diaphragm 133 away from the adsorbent bed 132 further reduces the pressure above the adsorbent bed 132, draws in more fresh air from the left hand side of the bed 132 and draws out more of the depleted nitrogen rich gas from the bed 132. As the fresh air moves inwards into the space between the bed 132 and diaphragm 133 it has a significant velocity in a direction from left to right as shown in FIGS. 8, 9 and 10. After reaching its maximum deflection the diaphragm 133 starts to return towards the dished bed 132. Again the left hand side of the diaphragm moves first, as shown most clearly in FIG. 10 and this leads to the left hand side of the diaphragm 133 forming a seal with the annular seat 31 at the left hand side of the diaphragm whilst the right hand side of the diaphragm is still out of contact with the right hand side of the annular seat 131, again as shown in FIG. 10. The transverse movement of air across the face of the dished bed 132 leads to an effective scavenge of the depleted, nitrogen rich air from the surface of the bed 132 and out of the right hand side of the gas separator module between the right hand side of the annular seat 131 and the diaphragm 133. As the diaphragm 133 continues to move towards the adsorbent bed it eventually seats against the entire circumference of the annular seat 131 so closing the valve and pressurising the fresh air introduced into the module and forcing it into the adsorbent bed 132. After reaching a point of maximum deflection towards the bed 132 the diaphragm again starts to return and move away from the bed 132. Again it is the left hand side of the diaphragm which first lifts from its annular seat 131 to allow fresh air to enter the module from the left hand side and the process is repeated. The transverse wave action that is induced in the diaphragm 133 also encourages the movement of air in the transverse direction from the left hand side to the right hand side of the gas separator module.

A pressure-swing gas separator such as that described above offers both greater efficiency and lower capital costs by comparison with a conventional oxygen production plant such as a cryogenic oxygen recovery unit. A 2 metre radius sphere having its surface entirely covered by gas-separation modules is capable of producing 100 tonnes per day of 98% oxygen with an oxygen recovery ratio, that is the ratio by volume of oxygen input to oxygen output, of 100:15 and a specific energy consumption, that is the mechanical energy input required to produce 1 kilogram of oxygen, of 0.125 kW hr/kg. The 98% oxygen mixture produced is suitable for use in industrial processes such as iron and steel-making but may also be used for other purposes such as sewage-treatment or the generation of oxgyen for medical use. For these alternative uses the scale of the device and the concentration of the oxygen produced may be varied to suit the needs of the particular application. Where only low volumes of oxygen are required a gas-separator unit formed by a single circular bed and diaphragm such as that described above may be used with an ogival gas resonance device such as that described above.

A detailed mathematical discussion of the theory behind the pressure swing gas separation techniques discussed above is contained in my co-pending U.S. Pat.

No. 07/435,121 filed on even date herewith and now U.S. Pat. No. 5,069,688, which is incorporated herein by reference.

In a fourth example of the present invention shown in FIGS. 11 and 12 the thermally driven gas-resonance device is used to power a combined heat and power (CHP) plant. Whereas in the third example discussed above the greater part of the icosahedral shell 103 was formed from gas-separator units in this fourth example only one or two such gas-separator modules 106 are used. The output from these few gas-separator modules is used to enrich the gas mixture fed to the combustion unit 102. This has the effect of sharpening the thermal pulse and reducing the production of undesirable by-products such as NOX.

In the combined heat and power unit the pressure swings generated within the spherical chamber 101 of the resonance device can be used to drive a heat pump. A regenerator 120 is formed as an equatorial belt extending around the inside of the chamber 101 close to but spaced from the inner walls of the icosahedral shell 103. The regenerator 120 is formed from a honeycomb of low thermal conductivity in the radially outwards direction. The honeycomb material may be formed from this aluminium foil. The effective thermal conductivity of such a honeycomb is low because the thickness of the foil is very much less than the radial extent of the regenerator: in a 2 m sphere the regenerator typically has a radial extent of 5 cm while the foil is only 0.2 mm or less thick.

The gas in the region of the regenerator 120 goes through repeated compression and expansion cycles driven by the pressure swings within the chamber 101. As the gas expands and contracts it takes up heat from the regenerator 120 and subsequently gives back heat. The physical distance moved by the gas in the vicinity of the regenerator 120 is relatively small by comparison with the dimensions of the regenerator 120 so that regions of gas towards the centre of the regenerator generally stay in thermal contact with the regenerator throughout the compression and expansion phases of the cycle. The process for these regions is therefore symmetrical and there is no net heat transfer to or from the regenerator 120. At the inner and outer faces of the regenerator however the gas moves away from the regenerator 120 during part of its cycle and so the symmetry of the process is broken, resulting in a net heat flow. It can be shown by a simple analysis discussed in detail in my earlier U.S. Pat. Nos. 4,948,360 and 5,006,060 that the direction of the heat flow is such that the radially inner surface of the regenerator 120 is cooled and the outer surface is heated.

If the heat pumping described above is to be put to use then some means is required to sink or source heat from the regenerator 120 for the purposes of cooling or heating as appropriate. As noted above a water spray is directed into the chamber 101 to enhance the operation of the gas resonance device and this spray may conveniently be used as the medium for heat transfer at the regenerator 120. That part of the spray which reaches the regenerator 120 collects on the internal surfaces of the regenerator and is progressively swept by the gas flow within the regenerator to its radially inner and outer faces in roughly equal proportions. The water at the inner face acts as a heat source and is cooled while conversely the water at the outer face acts as a heat sink and is warmed. Channels are provided at the base of the regenerator 120 to collect separately the water drained from the inner and outer surfaces and this water may then be pumped away and circulated, enabling the CHP to provide winter heating or summer cooling.

In addition to providing heating and/or cooling the CHP provides electrical power in the form of single-phase alternating current. Generally circular power generating modules are fitted into the triangular elements 104 of the icosahedral frame of the chamber 101 in the same manner as the air-separator modules described above. As with the air-separator modules the power generating modules use circular diaphragms 109 with the same resonant frequency as the chamber 101 driven by the pressure swings within the chamber 101. Where necessary a single module may combine the functions of power generation and air separation. If, alternatively, a dedicated power-generation module is used then the circular diaphragm is mounted above a simple cavity rather than a zeolite bed. The current is generated in a cylindrical conducting coil 121 mounted centrally on the diaphragm 109 with its longitudinal axis normal to the surface of the diaphragm 109. A permanent magnet 122 is mounted adjacent the coil but clear of the diaphragm 109. The movement of the coil in the magnetic field generates a current at the frequency of the oscillation of the diaphragm, that is at 200 Hz in the present example. The efficiency of the thermally-driven gas resonance device is such that an electrical generator of the type described can match the efficiency of conventional devices such as diesel-electric generators and is likely to have considerably lower maintenance costs.

Figure 2:
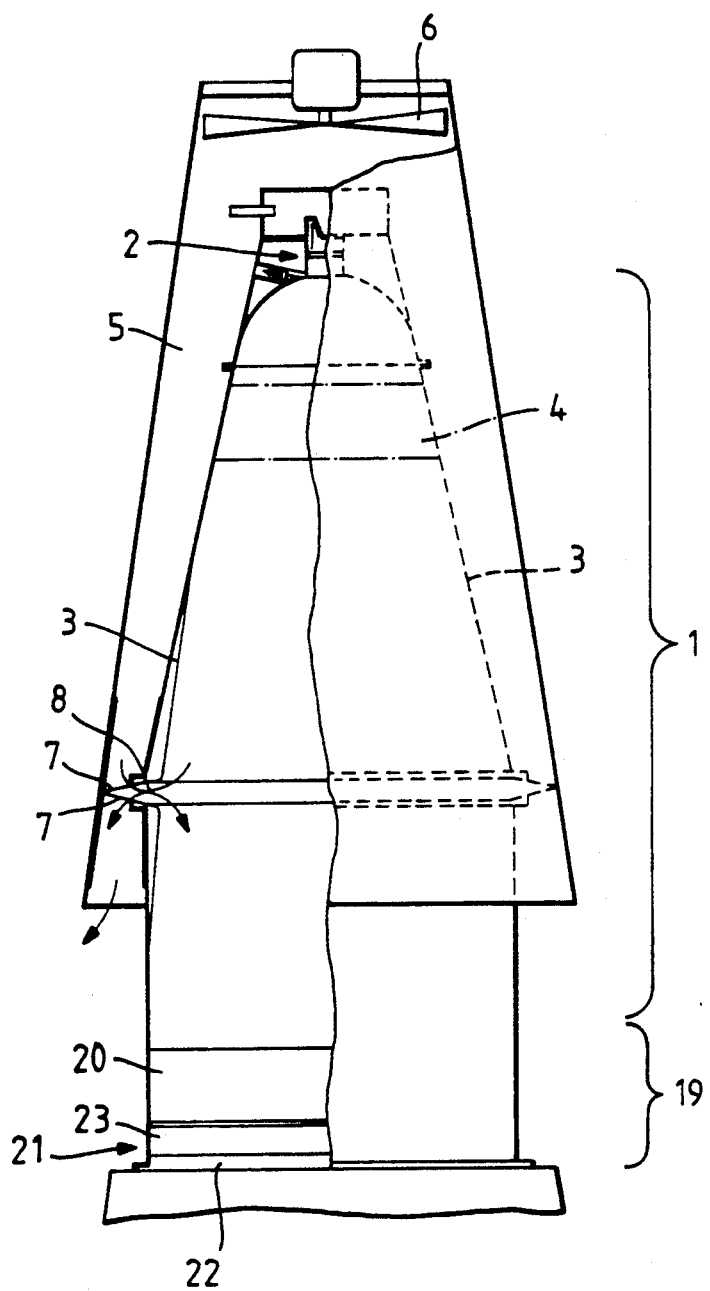
FIG. 2 is a partly sectional side elevation of a second example.

Such power generating modules may also be mounted in the widest end of the generally conical resonance chamber 1 shown in FIGS. 1 and 2 to provide a smaller capacity combined heat and power plant.

Although specific examples are discussed above the scope of the present invention is not of course in any way limited to the particular functional modules described. The modular nature of the gas resonance device is such that it may readily be adapted for different purposes by incorporating suitable designed modules. In practice such a thermally-driven gas resonance device may advantageously be used for any of the many applications in which a high efficiency thermally driven engine is required.

I claim:

1. A thermally driven gas resonance device, containing gas, in combination with a pressure swing gas separator, wherein, in response to pulsed combustion, said gas oscillates to provide pressure changes required to drive said pressure swing gas separator.

2. The apparatus of claim 1, wherein said thermally driven gas resonance device comprises a substantially spherical resonance chamber and a pulsed combustor, said pulsed combustor being located in the middle of said substantially spherical resonance chamber, and said pressure swing gas separator being located at the periphery of said substantially spherical resonance chamber.

3. The apparatus of claim 2, wherein said pulsed combustor has a pulse repetition frequency corresponding to a resonance frequency of said substantially spherical resonance chamber.

4. The apparatus of claim 3, wherein said pulsed combustor includes:

a valve having an input side and an output side;
means to supply a mixture of air and one of an inflammable gas and vapour, to said input side of said valve;

a flame trap, located downstream of said output side of said valve; and, an ignitor, located in said substantially spherical resonance chamber downstream of said flame trap initially to ignite said mixture.

5. The apparatus of claim 1, wherein said thermally driven gas resonance device comprises:

a resonance tube, having a first end and a second end and having a frusto-ogival shape between said first and second ends whereby, when seen in longitudinal section, side walls of said resonance tube are curved; and, a pulsed heat source, said pulsed heat source being located at said first end of said resonance tube.

6. The apparatus of claim 5, wherein said pulsed combustor has a pulse repetition frequency corresponding to a resonance frequency of said substantially spherical resonance chamber.

7. The apparatus of claim 6, wherein said pulsed heat source includes:

a valve having an input side and an output side;

means to supply a mixture of air and one of an inflammable gas and vapour, to said input side of said valve;

a flame trap, located downstream of said output side of said valve; and an ignitor, located in said substantially spherical resonance chamber downstream of said flame trap initially to ignite said mixture.

8. A pressure swing gas separator comprising a pulsed combustor, a gas resonance chamber having a resonant frequency, a diaphragm bounding part of said gas resonance chamber, said pulsed combustor and said gas resonance chamber forming a gas resonance device which provides mechanical oscillation of said diaphragm, and a bed of adsorbent material adjacent said diaphragm and on a side of said diaphragm remote from said pulsed combustor, said gas resonance device providing the mechanical energy to drive gas into and out of said adsorbent bed to operate said pressure swing gas separator.

9. The pressure swing gas separator of claim 8, wherein said diaphragm is a tuned diaphragm having a natural resonant frequency corresponding to that of said resonance chamber.

10. The pressure swing gas separator of claim 9, which also includes a closed chamber and a valve means, said bed of adsorbent material being housed within said closed chamber and said valve means controlling the flow of mixed gas into an exhaust of depleted gas from said side of said bed adjacent said diaphragm.

11. A thermally driven gas resonance device comprising a resonance chamber, a pulsed combustor located within said resonance chamber and providing combustion pulses to drive said resonance chamber into resonance, a bed of absorbent material which preferentially absorbs oxygen or nitrogen, bounding at least part of said resonance chamber, whereby a mechanical oscillation resulting from gas resonance within said chamber provides power for a pressure swing gas separator which performs a pressure swing gas separation on air to produce a gas phase which is rich in oxygen, at least a portion of said gas phase which is rich in oxygen being mixed with an inflammable gas or vapour to provide mixed gases, said gas resonance device further including means for feeding said mixed gases to said pulsed combustor to accelerate combustion and sharpen the intensity of said combustion pulses and thereby enhance mechanical resonance induced within said resonance chamber.

12. The gas resonance device of claim 11, wherein said resonance chamber is substantially spherical and has a resonant frequency, said pulsed combustor being located in the middle of said substantially spherical resonance chamber.

13. The gas resonance device of claim 12, wherein said substantially spherical resonance chamber is icosahedral and formed from substantially triangular segments having curved edges.

14. The gas resonance device of claim 13, wherein said pulsed combustor has a pulse repetition frequency corresponding to said resonance frequency of said substantially spherical resonance chamber.

15. The gas resonance device of claim 14, wherein said pulsed combustor includes:

a valve having an input side and an output side;

means to supply a mixture of air and one of an inflammable gas and vapour, to said input side of said valve;

a flame trap, located downstream of said output side of said valve; and, an ignitor, located in said resonance chamber downstream of said flame trap initially to ignite said mixture.

16. The gas resonance device of claim 13, wherein said resonance chamber is at least partly bounded by a plurality of diaphragms of generally circular configuration, three of said circular diaphragms being contained wholly within each substantially triangular segment of said icosahedron and others of said generally circular diaphragms being located at points of said icosahedron.

* * * * *